United States Patent [19]
Graf et al.

[11] Patent Number: 5,390,117
[45] Date of Patent: Feb. 14, 1995

[54] TRANSMISSION CONTROL WITH A FUZZY LOGIC CONTROLLER

[75] Inventors: Friedrich Graf, Regensburg; Gregor Probst, Landshut; Hans-Georg Weil, Starnberg, all of Germany

[73] Assignee: Siemens Aktiengesellschaft, Munich, Germany

[21] Appl. No.: 84,344

[22] Filed: Jun. 28, 1993

[30] Foreign Application Priority Data

Jun. 30, 1992 [EP] European Pat. Off. ............ 92111076

[51] Int. Cl.[6] .................. B60K 41/06; B60K 31/04
[52] U.S. Cl. .................. 364/424.1; 364/424.05; 395/905; 477/125; 477/902
[58] Field of Search .......... 364/424.1, 424.05, , 364/424.02, 426.04; 74/866, 865, 862; 395/900, 908, 905

[56] References Cited

U.S. PATENT DOCUMENTS

| | | | |
|---|---|---|---|
| 4,679,145 | 7/1987 | Beeck et al. | 364/424.1 |
| 4,841,815 | 7/1989 | Takahashi | 74/866 |
| 4,842,342 | 7/1989 | Takahashi | 364/424.02 |
| 5,019,979 | 5/1991 | Takahashi | 364/424.1 |
| 5,021,958 | 6/1991 | Tokoro | 364/426.04 |
| 5,025,684 | 7/1991 | Stehle et al. | 74/862 |
| 5,089,963 | 2/1992 | Takahashi | 364/424.1 |
| 5,124,916 | 6/1992 | Tokoro et al. | 364/424.1 |
| 5,148,721 | 9/1992 | Anan et al. | 74/866 |
| 5,162,997 | 11/1992 | Takahashi | 364/424.05 |
| 5,235,875 | 8/1993 | Yoshida et al. | 364/424.1 |
| 5,235,876 | 8/1993 | Minowa et al. | 364/424.1 |

FOREIGN PATENT DOCUMENTS

| | | |
|---|---|---|
| 0375155 | 6/1990 | European Pat. Off. . |
| 0471102 | 2/1992 | European Pat. Off. . |
| 3341652 | 12/1987 | Germany . |
| 4112577 | 10/1991 | Germany . |
| 2212655 | 8/1990 | Japan . |
| 3121354 | 5/1991 | Japan . |

OTHER PUBLICATIONS

"A Method of Predicting the Driving Environment From the Driver's Operational Inputs", Takahashi, pp. 203–204, No Date.
"Fuzzy Control—eine Einführung ins Unscharfe", Dirk Abel, Automatisierungstechnik 39, 1991, pp. 433–438, Dec. 1991.

Primary Examiner—Kevin J. Teska
Assistant Examiner—Tan Nguyen
Attorney, Agent, or Firm—Herbert L. Lerner; Laurence A. Greenberg

[57] ABSTRACT

A control for a motor vehicle transmission automatically shifts transmission gears as a function of at least a driving pedal position and vehicle speed on the basis of shifting performance graphs stored in memory, and takes a load state of the motor vehicle and the driving style of the driver into account. A fuzzy logic controller with a rule base evaluates various signals characterizing driving states of the motor vehicle, and thereupon generates the following control signals: a first correcting signal characterizing the load state of the motor vehicle, and a second correcting signal characterizing the driving style, bringing about a switchover to corresponding shifting performance graphs; and an inhibit signal preventing shifting events that would produce a dynamically unfavorable driving state.

7 Claims, 15 Drawing Sheets

TRANSMISSION CONTROL WITH A FUZZY LOGIC CONTROLLER

BACKGROUND OF THE INVENTION

FIELD OF THE INVENTION

The invention relates to a control for a vehicle transmission (transmission control), through which transmission gears are automatically shifted as a function of at least a driving pedal position and vehicle speed on the basis of shifting performance graphs stored in memory, and through which a load state of the motor vehicle and the driving style of the driver are taken into account.

In one such known transmission control (from German Patent DE 33 41 652 C2, corresponding to U.S. Pat. No. 4,679,145), the transmission gears are shifted automatically as a function of the position of the driving pedal and the vehicle speed or engine rpm, using shifting performance graphs stored in memory. The load state of the motor vehicle, or in other words the vehicle load and the inclination of the roadway, and the individual driving style of the driver are also taken into account. Taking the particular driving situation into account is done by adaptation of performance graphs, or in other words by selecting a performance graph suitable for the particular driving situation, according to which graph the shifting can then be controlled. In order to enable the various variables that affect the performance of the motor vehicle to be taken into account, considerable expense is undergone when using known methods in closed and open-loop control technology.

In other known automatic transmission controls (known from U.S. Pat. No. 4,841,815; Published European Application No. 0 375 155 A1; and an article by H. Takahashi, entitled: A method of Predicting the Driving Environment From the Driver's Operational Inputs, in IFSA '91, Brussels, pp. 203-206), the selection of the particular gear to be shifted is performed by means of controllers operating by the methods of fuzzy logic. With this logic, expert knowledge that has been obtained by experience is written in the form of a so-called rule base and therefore used for the closed or open-loop control processes.

SUMMARY OF THE INVENTION

It is accordingly an object of the invention to provide a transmission control, which overcomes the hereinafore-mentioned disadvantages of the heretofore-known devices of this general type and which takes the various variables influencing driving dynamics into account without entailing major effort and yet is unlimitedly safe in operation.

With the foregoing and other objects in view there is provided, in accordance with the invention, in a control for a motor vehicle transmission, through which transmission gears are automatically shifted as a function of at least a driving pedal position and vehicle speed on the basis of shifting performance graphs stored in memory, and through which a load state of the motor vehicle and the driving style of the driver are taken into account, the improvement comprising a fuzzy logic controller with a rule base, for evaluating various signals characterizing driving states of the motor vehicle, and thereupon generating the following control signals: a first correcting signal characterizing the load state of the motor vehicle, and a second correcting signal characterizing the driving style, bringing about a switchover to corresponding shifting performance graphs; and an inhibit signal preventing shifting events that would produce a dynamically unfavorable driving state.

The advantages of the transmission control according to the invention are in particular that with fuzzy logic, many influential variables can be taken into account in a simple manner, yet because of the use of performance graphs it is always assured that impermissible shifting will not be carried out.

In accordance with another feature of the invention, there is provided a selection circuit connected to the fuzzy logic controller for receiving the first and second correcting signals, through which the shifting performance graph switchover is carried out.

In accordance with a further feature of the invention, there is provided a shifting process control connected to the fuzzy logic controller for receiving the inhibit signal, through which shifting is prevented.

In accordance with an added feature of the invention, there are provided wheel rpm sensors furnishing signals, and a signal preparation circuit connected to the wheel rpm sensors for receiving the signals from the wheel rpm sensors to ascertain a transverse acceleration of the motor vehicle and preventing shifting by the fuzzy logic controller if a predetermined value for the transverse acceleration is exceeded.

In accordance with an additional feature of the invention, there is provided a signal preparation circuit in which a differential force characterizing the load state of the motor vehicle is ascertained from drive force, air resistance, rolling resistance, acceleration resistance and brake force, and is evaluated in the fuzzy logic controller.

In accordance with a concomitant feature of the invention, there is provided an ABS control unit or a corresponding sensor transmitting the value of the brake force to the signal preparation circuit.

Other features which are considered as characteristic for the invention are set forth in the appended claims.

Although the invention is illustrated and described herein as embodied in a transmission control, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
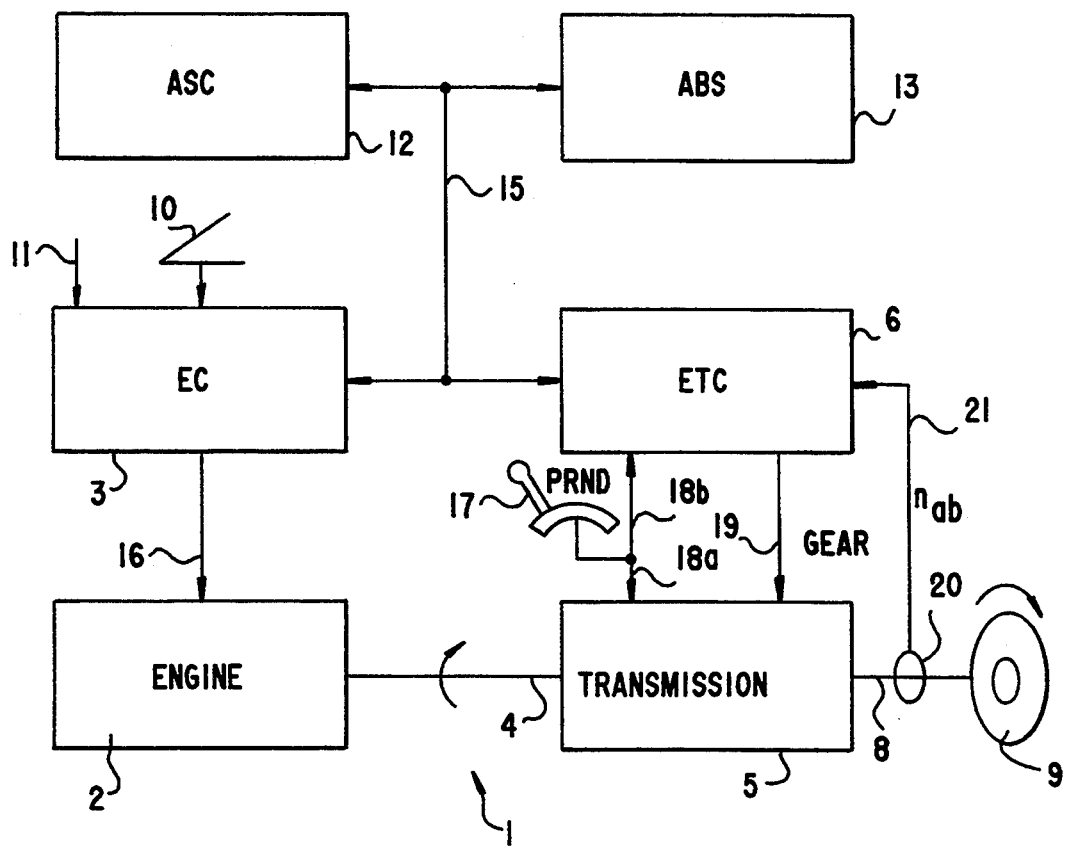
FIG. 1 is a schematic and block circuit diagram showing essential components of a motor vehicle with a transmission control according to the invention.

Referring now to the figures of the drawing in detail and first, particularly, to FIG. 1 thereof, there is seen a schematic and block diagram of a motor vehicle 1 which has an engine 2 that is controlled by an engine control (EC) 3. An engine Output or power take-off shaft 4 is connected, through a non-illustrated torque converter, to a transmission 5 which is controlled by an electronic transmission control (ETC) 6 according to the invention. A transmission output or power take-off shaft 8 is connected to a driven axle of the motor vehicle, which is represented herein by a driven wheel 9.

A driver of the motor vehicle sends his or her commands, or in a strict sense his or her wishes, through a driving pedal or accelerator 10 to the engine control 3. Upon actuation of the brakes, a braking signal which is generated by a brake light switch, for instance, reaches the engine control 3 over a line 11. The motor vehicle is also equipped with a wheel slip or antislip control (ASC) or traction control 12 and an antilock brake system (ABS) 13, which are connected to one another and are connected to the engine control 3 and to the transmission control 6 by signal lines 15 for the purpose of exchanging signals. A signal line 16 carries signals sent by the engine control 3 to the engine 2 with which an ignition, injection and throttle valve are controlled (the last of these is controlled only if a suitable control device is present). The driver determines the driving range of the automatic transmission 5 in the usual manner with a selector lever or shift 17. Signals from the selector lever reach the transmission 5 through a mechanical connection 18a and reach the transmission control 6 over an electrical signal line 18b. A signal line 19 carries control signals sent from the transmission control 6 to the transmission 5. These signals define the applicable gear and the shifting events.

The rpm of the transmission output shaft 8 and therefore the wheel speed are reported to the transmission control 6 by an rpm sensor 20 over a signal line 21.

At least the signal lines 15 that connect the control units 3, 6, 12 and 13 to one another may include either individual signal lines, each of which transmits only one signal, or a bidirectional bus in the form of a local area network (LAN), or some other known bus.

Figure 2:
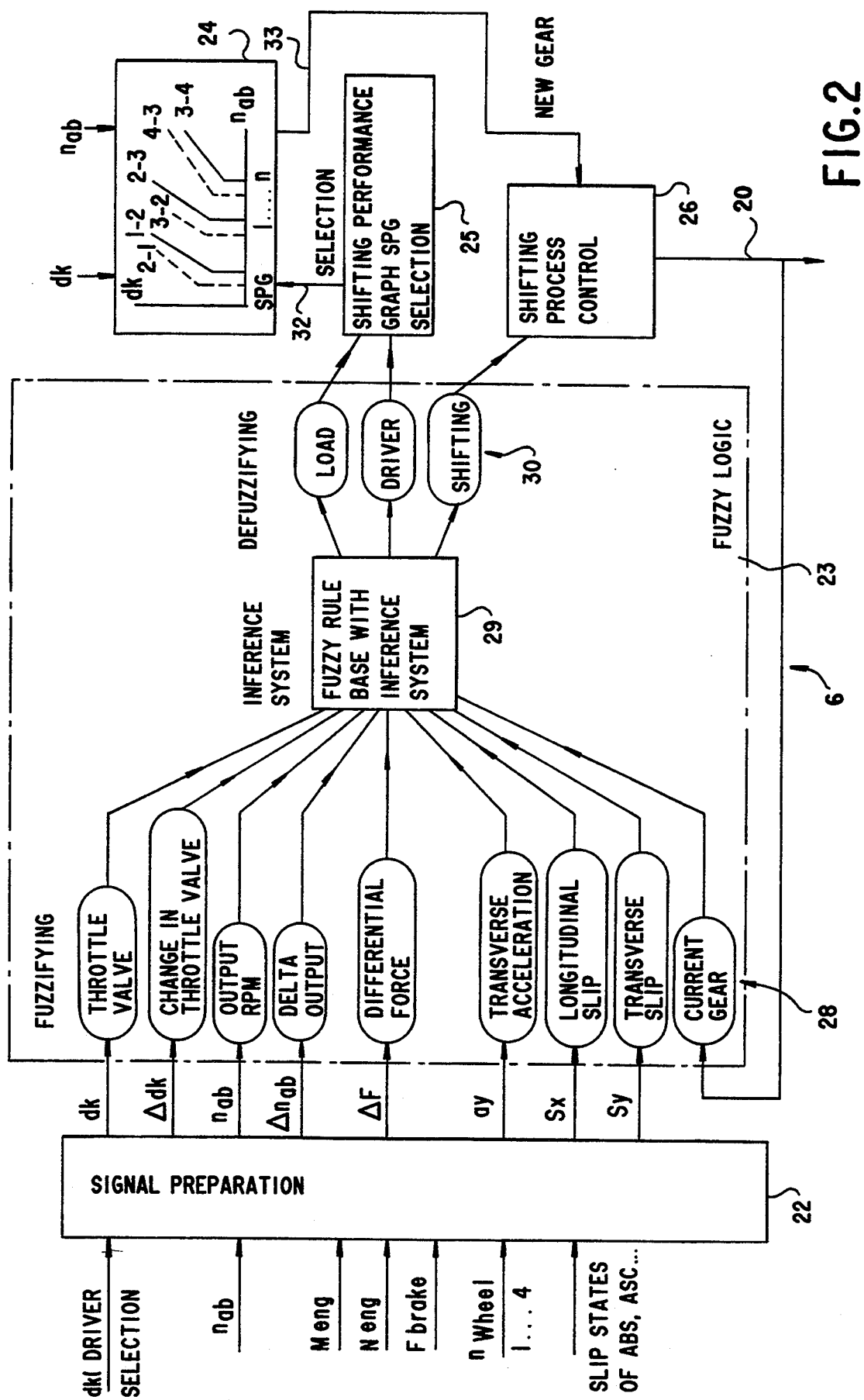
FIG. 2 is a block circuit diagram showing the transmission control of the motor vehicle of FIG. 1.

The electronic transmission control 6 shown in FIG. 2 has the following elements: a signal preparation circuit (indicated as signal preparation for short) 22, a fuzzy logic controller (indicated as fuzzy logic for short) 23, a performance graph memory 24 with a plurality of shifting performance graphs, a shifting performance graph (SPG) selector 25, and a shifting process control 26.

In the signal preparation circuit 22, a plurality of input signals that are furnished by various sensors or by the other control units are prepared. The input signals are converted into characteristic variables that can be processed by the fuzzy logic controller 23.

The following measurement values or parameters (in order from top to bottom) reach the signal preparation circuit 22 over input lines suggested in the drawings: a driver selection or request Dk that is expressed in the position of the throttle valve or in general of the driving pedal; a transmission output rpm $n_{ab}$; an engine torque $M_{eng}$; an engine rpm $N_{eng}$; a braking force $F_{brake}$; a wheel rpm $n_{wheel1} \ldots n_{wheel4}$, and a slip status signal that is furnished by the traction control 12 or by the ABS system 13, for example. The transmission control 6 accordingly also has operating parameters or sensor signals from other control units (if present).

In the signal preparation circuit 22, derived variables are also calculated from the input signals.

A driving pedal adjustment speed $\Delta Dk$ is calculated as a moving average of the amount of the change in the cyclically sampled value of the speed. The last value at the time is weighted at 80%, and the most recent value is weighted at 20%.

A transverse vehicle acceleration ay is calculated from the wheel speeds furnished by rpm sensors, as follows:

$$ay = \frac{(v_{vr} - v_{vl}) * (v_{vl} + v_r)}{2\,b}$$

in which b = the vehicle width $v_{vl}$ = the front left wheel speed $v_{vr}$ = the front right wheel speed (with rear-wheel or four-wheel drive).

The above calculation of the transverse acceleration ay is correctly when no significant slip states are present. However, since other rules have higher priority than the influence of transverse acceleration in the case of slip states, the loss of currentness (being up to date) of ay has no effect if ay in the presence of slip is set at a substitute value.

Another derived variable is the differential force $\Delta F$, which can be calculated as follows:

$$\Delta F = F_b(t) - F_L(t) - F_R(t) - m_{Fzg} + \frac{d}{dt} n_{ab}(t) - F_{br}(t)$$

in which:

$F_b(t)$ = the drive force $F_L(t)$ = the air resistance $F_R(t)$ = the rolling resistance $m_{Fzg}*\Delta n_{ab}(t)$ = the acceleration resistance, and $F_{br}(t)$ = the brake force.

F stands for the force balance of the forces at the transmission output that affect the motor vehicle. In travel over level ground, if there is no external load, such as added cargo or a trailer, it must be zero. If not, then that is evidence for an increased vehicle mass, a sloping roadway and/or some external load (added cargo, trailer operation, etc). If the brake force can be furnished by an ABS control unit or a corresponding sensor, then according to the above equation a conclusive value for the differential force can be calculated. If the brake force is not furnished, then this must be taken into account by a rule base (to be described below).

Figure 3:
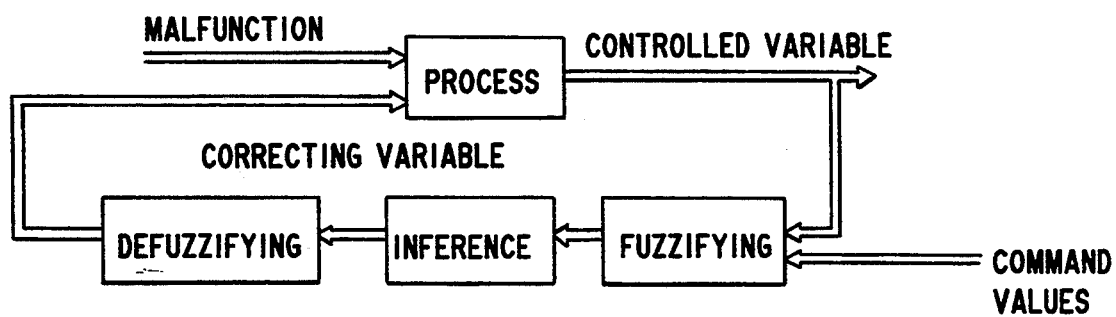
FIG. 3 is a block circuit diagram showing a fuzzy controller in a closed control loop.

Fuzzy controllers per se are described in the literature (such as in an article by D. Abel, entitled: Fuzzy control—eine Einführung ins Unscharfe [Fuzzy control—an Introduction to Fuzziness], AT 39 (1991), No. 12). Coupling a fuzzy controller to a process is performed analogously to a conventional controller. In other words, from a measured controlled variable and a predetermined command value, a correcting variable is calculated by means of an algorithm. In a fuzzy controller, this "algorithm" includes three components: a fuzzifier, an inference system, and a defuzzifier, as is seen in FIG. 3. As a result of the fuzzifying, the exactly predetermined (or "crisp") variables of the command value and controlled variable are copied to linguistic variables. Next, in the inference system, the linguistic rules, which are stored in the form of a so-called rule base, are worked through, and a fuzzily formulated correcting variable is determined. In these rules (see an example given below), the desired system performance is defined. The correcting variable determined by inference is converted by the defuzzifying into a physical correcting variable, which then directly influences the process to be controlled.

The measured values and derived variables converted into logical variables in the signal preparation circuit 22 of FIG. 2 pass over the lines shown in the drawing to a fuzzifier 28 of the controller 23, where they are converted into linguistic variables and transmitted to an inference system 29 containing the fuzzy rule base. Through the use of the rules defined in the rule base, the load state of the motor vehicle is calculated, driver categorization is carried out, or in other words a determination is made as to whether the way in which the driver drives is sporty or utility-oriented, and finally a determination is made as to whether upshifting or downshifting is permitted or prohibited.

The inference system 29 accordingly generates three signals, "load", "driver" and "shifting", which are converted into physical correcting variables in the defuzzifier and which control the shifting of the automatic transmission as output signals of the controller 23. The load and driver signals are linked together in the shifting performance graph selector 25 and produce a selection signal, which reaches the performance graph memory 24 over a signal line 32 and there selects the most favorable shifting performance graph in that given case.

Input signals of the performance graph memory 24 are the driver selection (throttle valve position Dk) and the transmission output rpm $n_{ab}$. If the operating state of the motor vehicle defined by these signals exceeds a characteristic curve, then a signal is generated that defines the new gear and is forwarded over a signal line 33 to the shifting process control 26. If the signal there, in the cases to be explained below, is not blocked by the "shifting" signal, then it is carried on over a signal line 20 to the transmission 5 where it brings about shifting to the new gear.

The "load" signal is a measure of externally dictated load states, in the form of increased vehicle loading and/or driving uphill or downhill. The "driver" signal describes the way that the driver drives, but this may also be indirectly influenced by such externally dictated conditions as the type of road (city street, rural road or highway, limited access highway). Both signals bring about the selection of suitable shifting performance graphs "SPG1–SPGn" in each case in the performance graph memory 24. Various possibilities for this are available. In the exemplary embodiment, if clearly defined limits for the signals are exceeded or fail to be attained, suitable shifting performance graphs are selected. The adaptation to the external load states has priority over the adaptation to the driving style in this case. Another option is for shifting characteristic curves to be shifted all of the way or part of the way out of individual shifting performance graphs.

The "new gear" signal, that is also recovered from a shifting performance graph, is delivered to the shifting process control 26. In it, the fuzzy logic controller can intervene actively with the "shifting" signal and can suppress certain types of shifting (upshifting or downshifting) or prohibit any shifting. With the "shifting" signal, shifting events that result from the shifting characteristic curves are dynamically corrected. One example is fast cornering. Through the use of the performance graph shifting, when entering a curve, when the driver lifts his foot from the gas, upshifting is carried out, while when leaving the curve, when the driver depresses the gas pedal again, shifting back again is performed. In this case, however, these shifting events, which worsen vehicle stability and ride or comfort and make for increased wear, are averted. Another example is slip states between the wheels of the motor vehicle and the roadway: The controller 23, in the shifting process control 26, avoids or delays shifting events that could additionally negatively affect vehicle stability. Moreover, the shifting process control 26, if it allows shifting, brings about triggering of the electrohydraulic actuators in the transmission 5 in such a way that gear changes are performed smoothly and comfortably.

The improved vehicle stability and increased comfort are attained by the expert knowledge that is included in the fuzzy rule base and transmission control safety is assured by the use of shifting performance graphs. A great deal of information is incorporated in the preparation of shifting performance graphs, such as reserve torque in the new gear, fuel consumption, and so forth, and this information is thus immediately available to the transmission control. The transmission control is therefore relieved of the burden of having to perform the very complicated calculation of that information. Impermissibly high or low engine rpm is reliably avoided. In no case does the driver have to intervene in the transmission control. The fuzzy logic controller 23 is prepared as a program in the higher programming language C or directly as an object code, with the aid of the commercially available CAE Tools. Besides this version, in the form of a program run on a microcomputer, the controller 23 may equally well be achieved by hardware, in the form of a peripheral unit to a computer system.

The inference system 29 includes the following three rule bases, where in each case the most important rules are discussed as examples. Other rules may easily be set up by one skilled in the art, following this pattern.

1. Fuzzy rule base, shifting

RULE shifting_7:
  IF (transverse acceleration IS VERY_HIGH) AND (rpm_nab IS not_low), THEN downshifting=downshifting_prohibited RULE rule 0022:
  IF (transverse acceleration IS LOW) AND (slip_rear IS LOW), THEN downshifting=downshifting_permitted RULE shifting_11:
  IF (slip_rear IS HIGH) and (rpm_nab IS not_low) THEN downshifting=downshifting_prohibited 2. Fuzzy rule base, driver RULE rule 0013:
  IF (delta_dki IS gas_greatly_increased) AND (delta_ab IS faster), THEN driver category=Manta_driver 3. Fuzzy rule base, load RULE rule_load_03:
  IF (diff_instant IS positive) AND (brake IS unpressed), THEN load=hill The content of the above-listed rule bases will readily be understood. The variables used in them have already been explained and are merely written in a slightly modified way in this case. For instance, the variable "delta_Dki" corresponds to the driving pedal adjustment speed $\Delta DK$, and the variable "rpm_nab" corresponds to the output rpm change $\Delta n_{ab}$.

Regarding the above-described rule bases, the following should also be noted:

RULE shifting_7:
  At high transverse acceleration and relatively high output rpm, downshifting is prohibited.

RULE rule 0022:
  At low transverse acceleration and low slip, downshifting is allowed.

RULE 0013:
  At high driving pedal speed and high longitudinal acceleration, a sporty driver is recognized.

RULE_load_03:
  If the instantaneous balance is positive and the brake is released, a hill is recognized.

Figure 10:
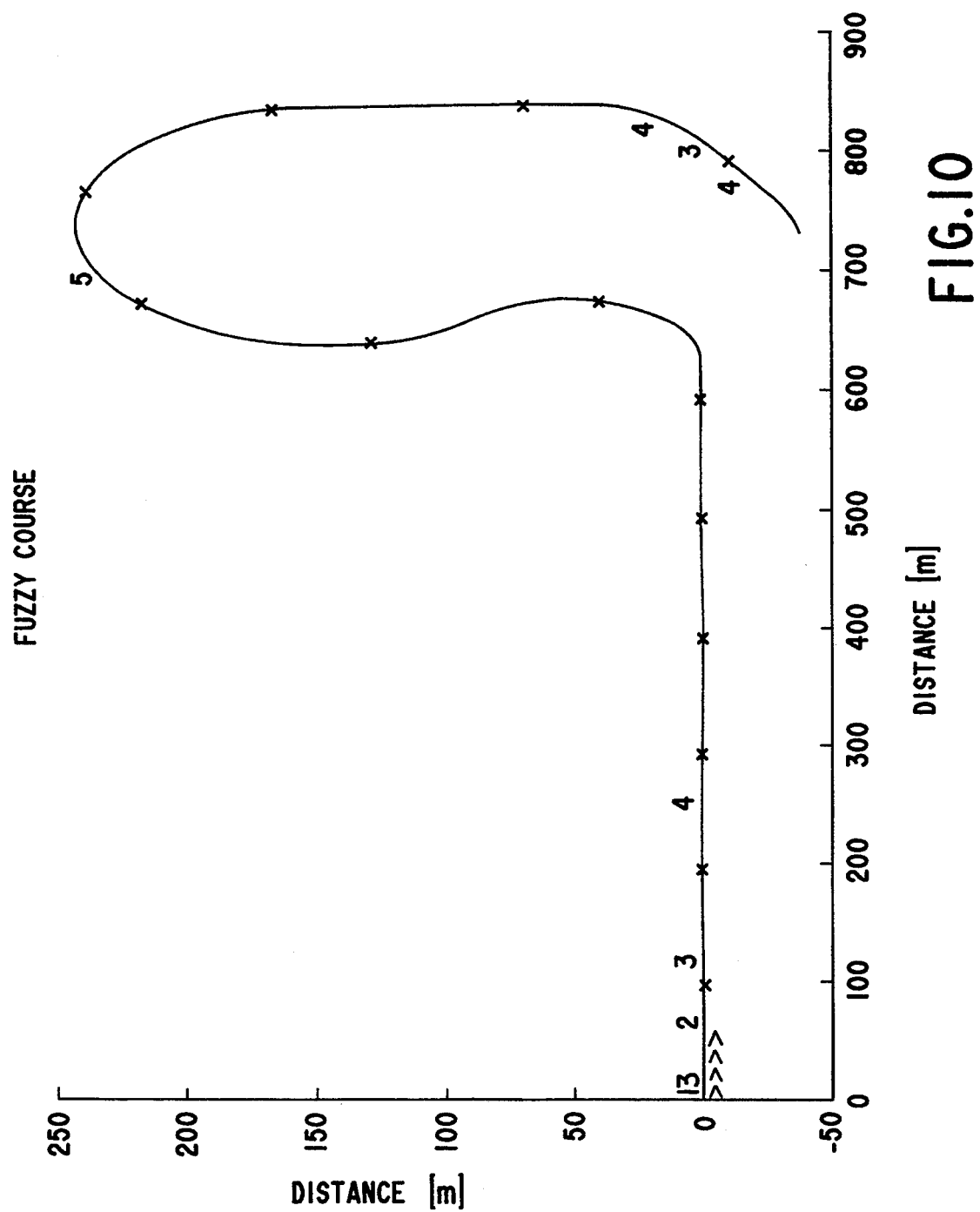
FIG. 10 is a graph showing an illustration of the distance traveled by a motor vehicle of FIG. 1 with fuzzy logic.
Figure 11:
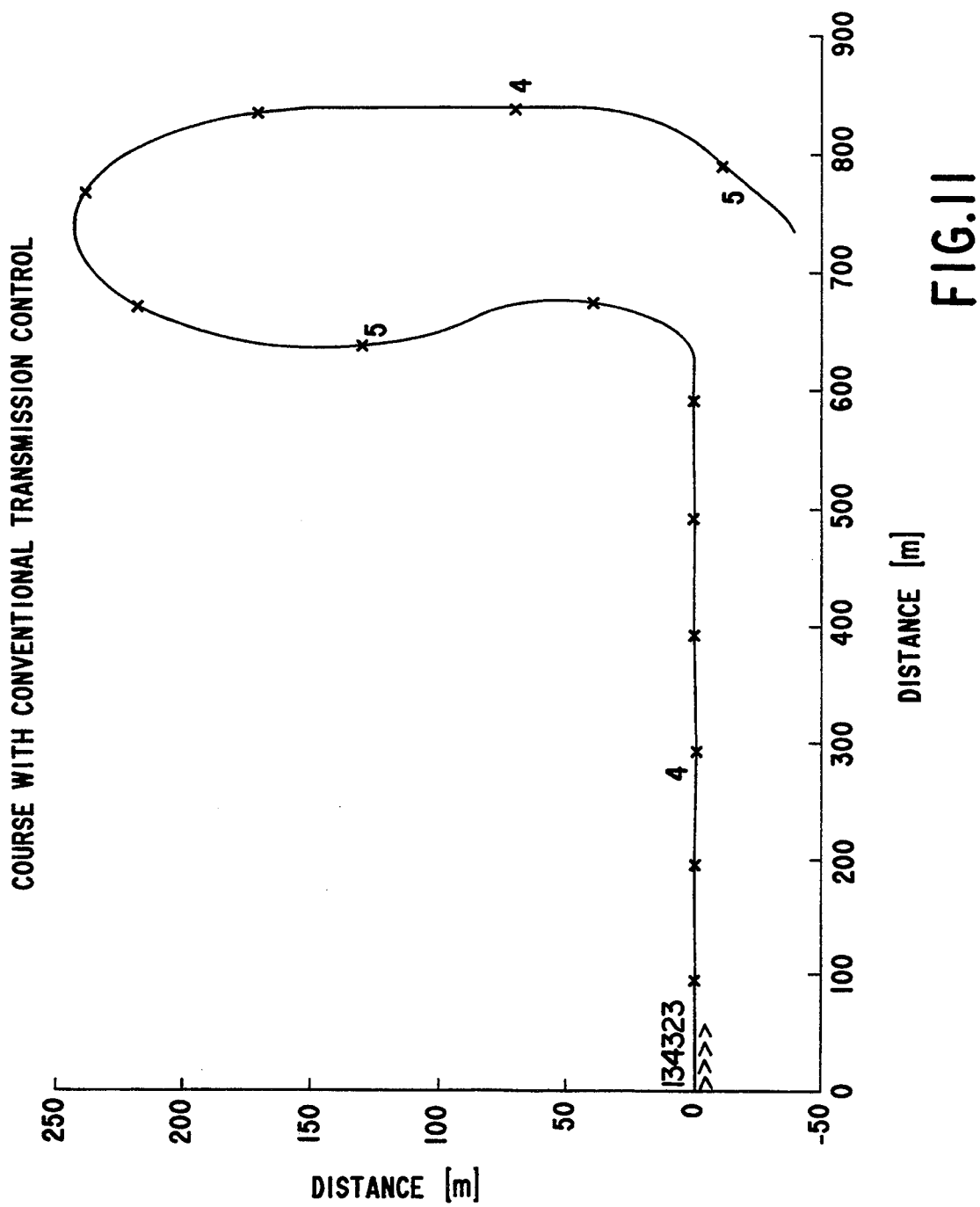
FIG. 11 is a graph showing a corresponding distance traveled by a motor vehicle with a transmission control that is not according to the invention.

The performance of a motor vehicle provided with a transmission control according to the invention will be explained below in conjunction with the drawing diagrams and compared with the performance of a motor vehicle with a conventional transmission control. "Conventional" in this case means merely that it is a transmission control without a fuzzy logic controller, but it is still certainly a modern transmission control. The performance of the two motor vehicles is observed over the same test route, having a course which can be seen from FIGS. 10 and 11. The route requires two meaningful driving maneuvers: first, the vehicle drives uphill at a grade of 15% for a length of 500 m (distance between 50 m and 550 m), and second, the vehicle attains a relatively high transverse acceleration (5 m/s$^2$) in a long curve.

Figure 4:
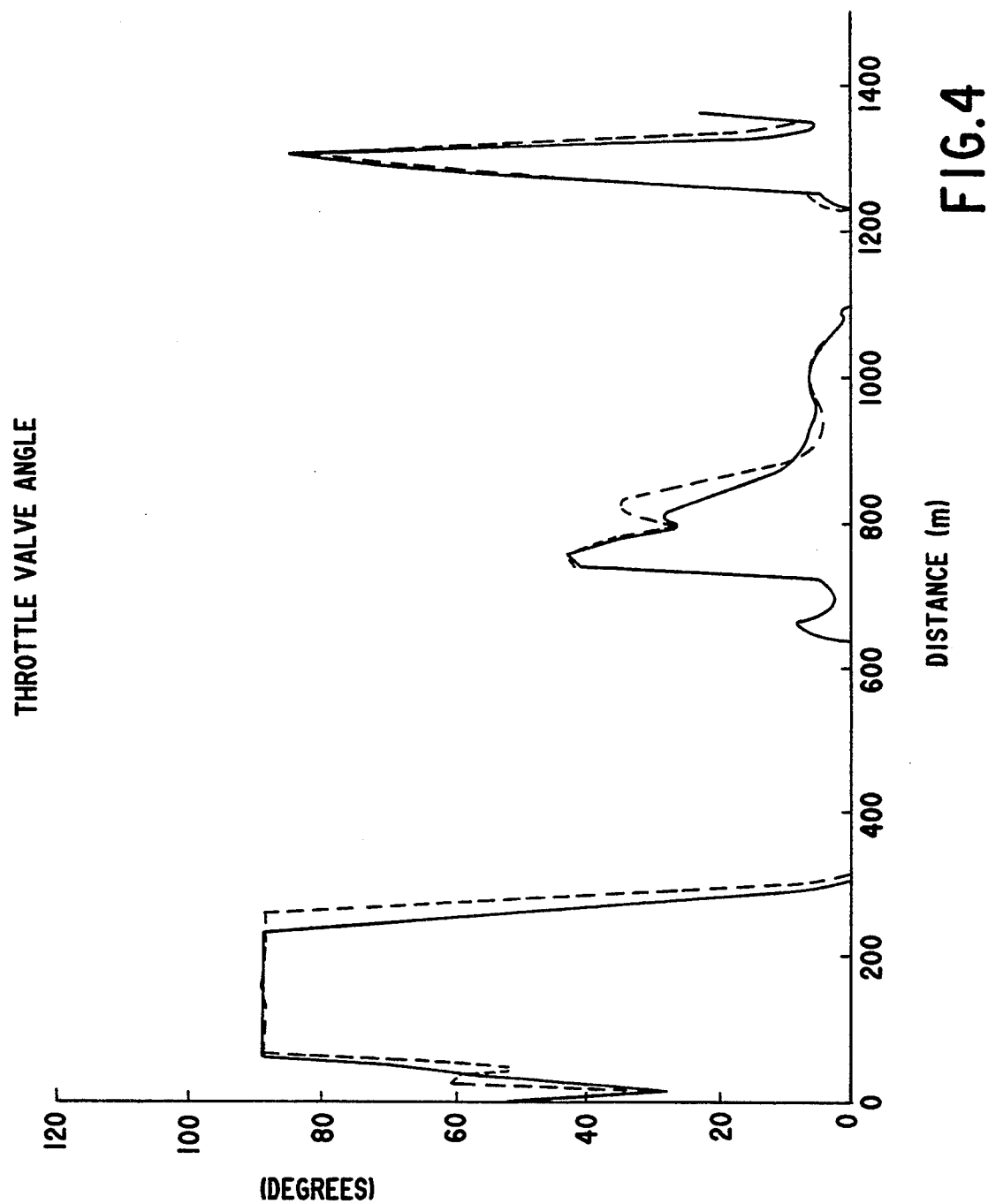
FIG. 4 is a graph showing a throttle valve angle plotted over a distance or travel of the motor vehicle, wherein a solid line indicates a fuzzy transmission control and a dashed line indicates a conventional transmission control.
Figure 5:
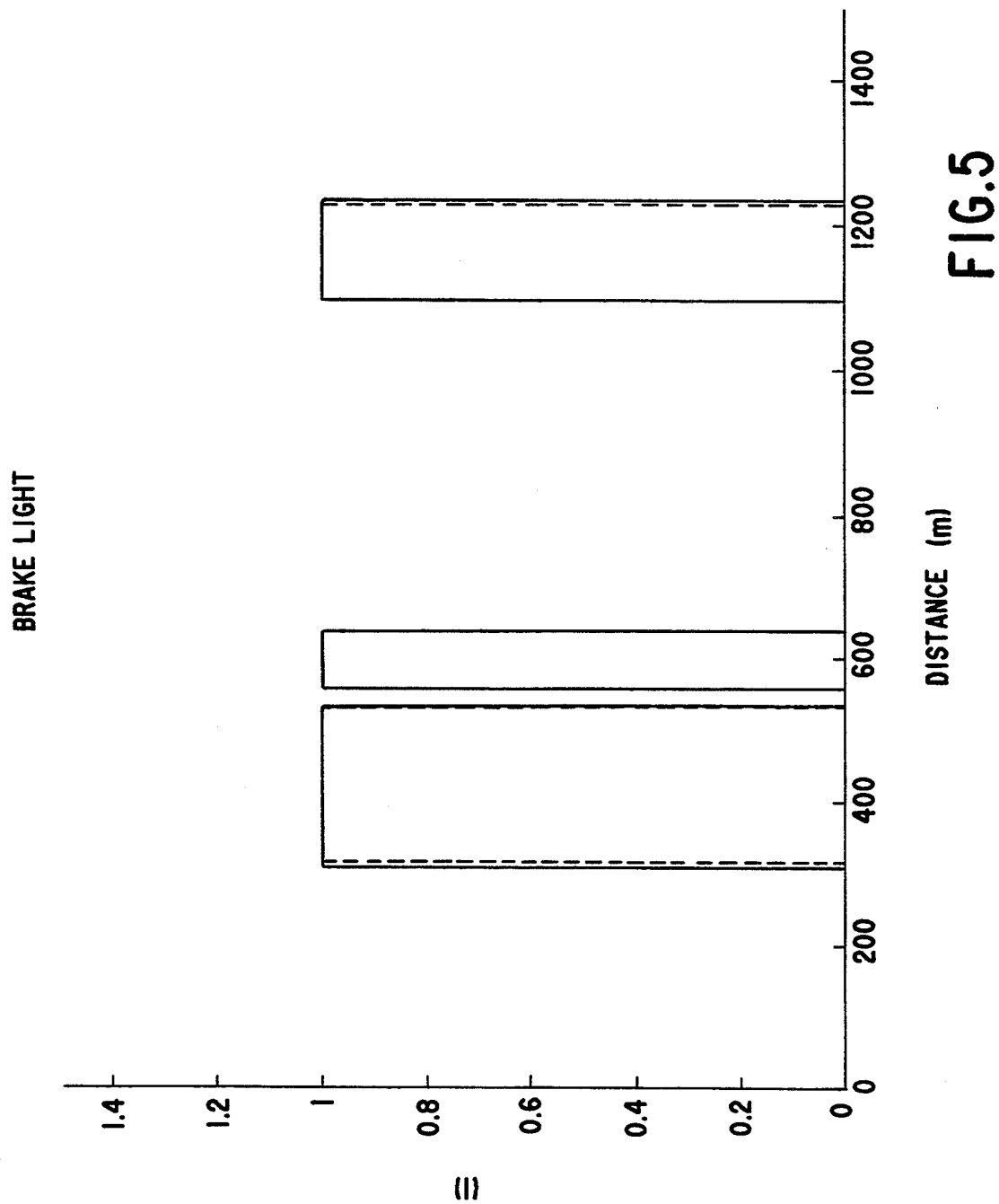
FIG. 5 is a graph showing a brake light signal plotted over the distance.
Figure 6:
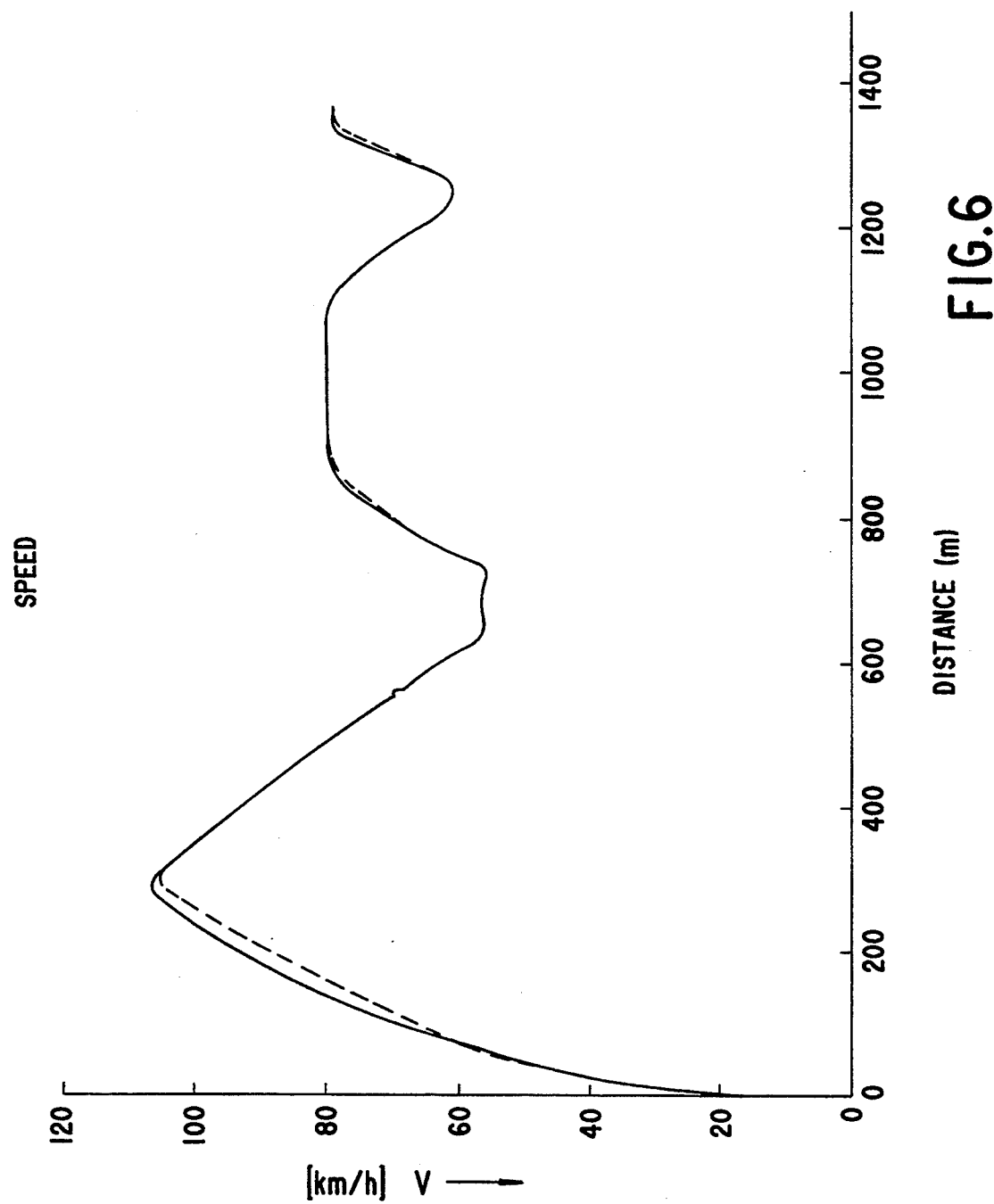
FIG. 6 is a graph showing a speed of the motor vehicle plotted over the distance.

In the case of both trips, the driver receives the same specifications in terms of vehicle performance. In the following drawing figures, the curves for the vehicle with a fuzzy logic controller are marked by a solid line, and the curves for the vehicle with a conventional controller are marked by dashed lines. It can be seen from the throttle valve position plotted over distance in FIG. 4 and from the brake light which is in the form of a binary signal shown in FIG. 5, that the driver with both transmission control versions behaves in virtually the same way and drives virtually the identical speed profile in FIG. 6. In transverse acceleration, driver-dictated differences are apparent in the range of lower values.

Figure 8:
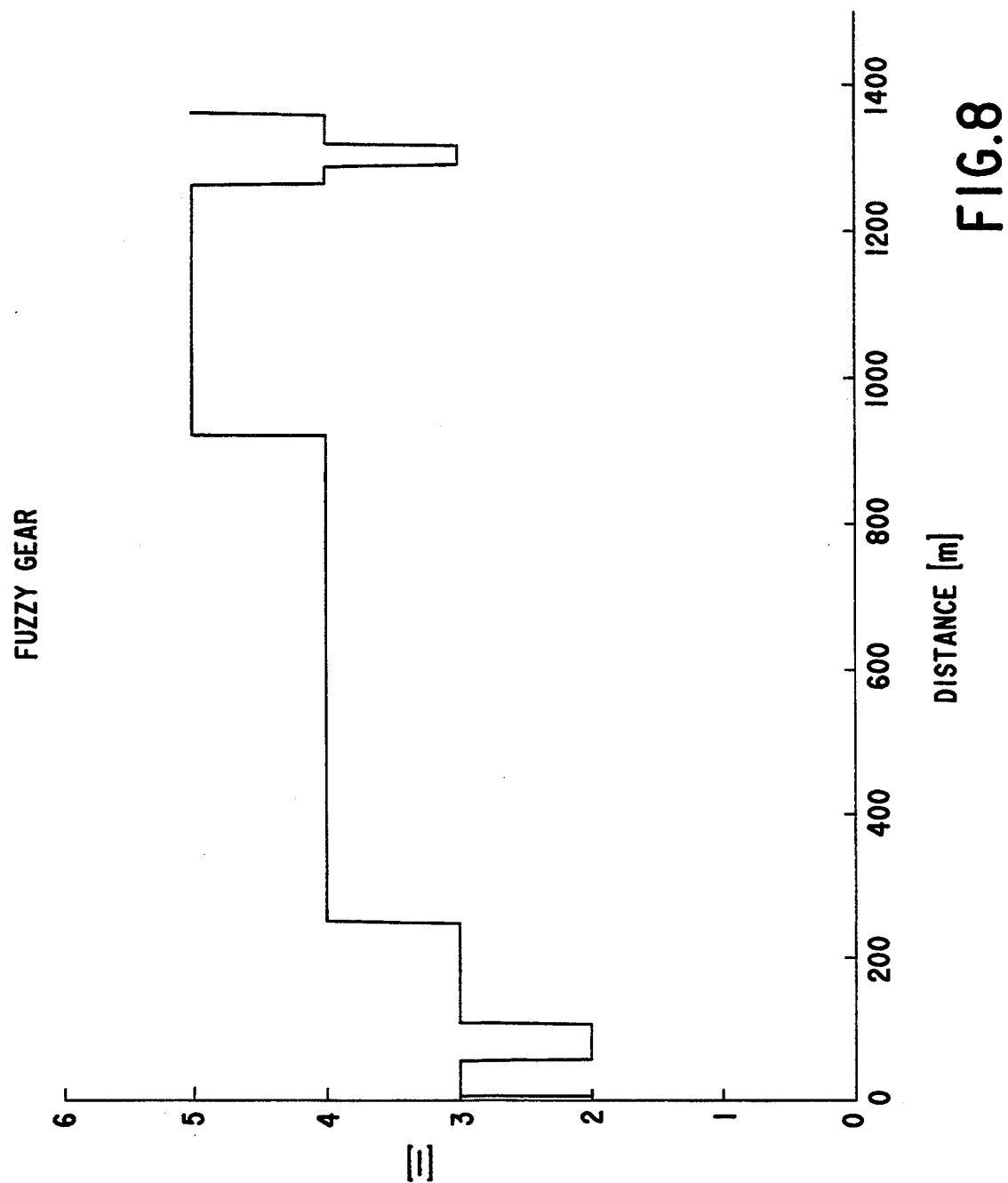
FIG. 8 is a graph showing gears shifted by the transmission control of FIG. 2, plotted over the distance.

A comparison in the driving speeds or gears selected in both transmission control versions shows marked differences. Firstly, the driving speeds of the fuzzy logic transmission control and of the conventional transmission control are plotted over distance in FIGS. 8 and 9 and secondly over a course plotted in the X-Y plane in FIGS. 10 and 11. In the latter diagram, arrow heads indicate a driving direction, small x's stand for 100 meter markers, and numbers next to the course line indicate the current gear that has been selected until the next shifting event.

In order to explain the differences between the driving speeds of the two transmission control versions, the signals copied below are to be included:
  driver category
  load category
  shifting performance graph number
  prohibition of downshifting.

Figure 12:
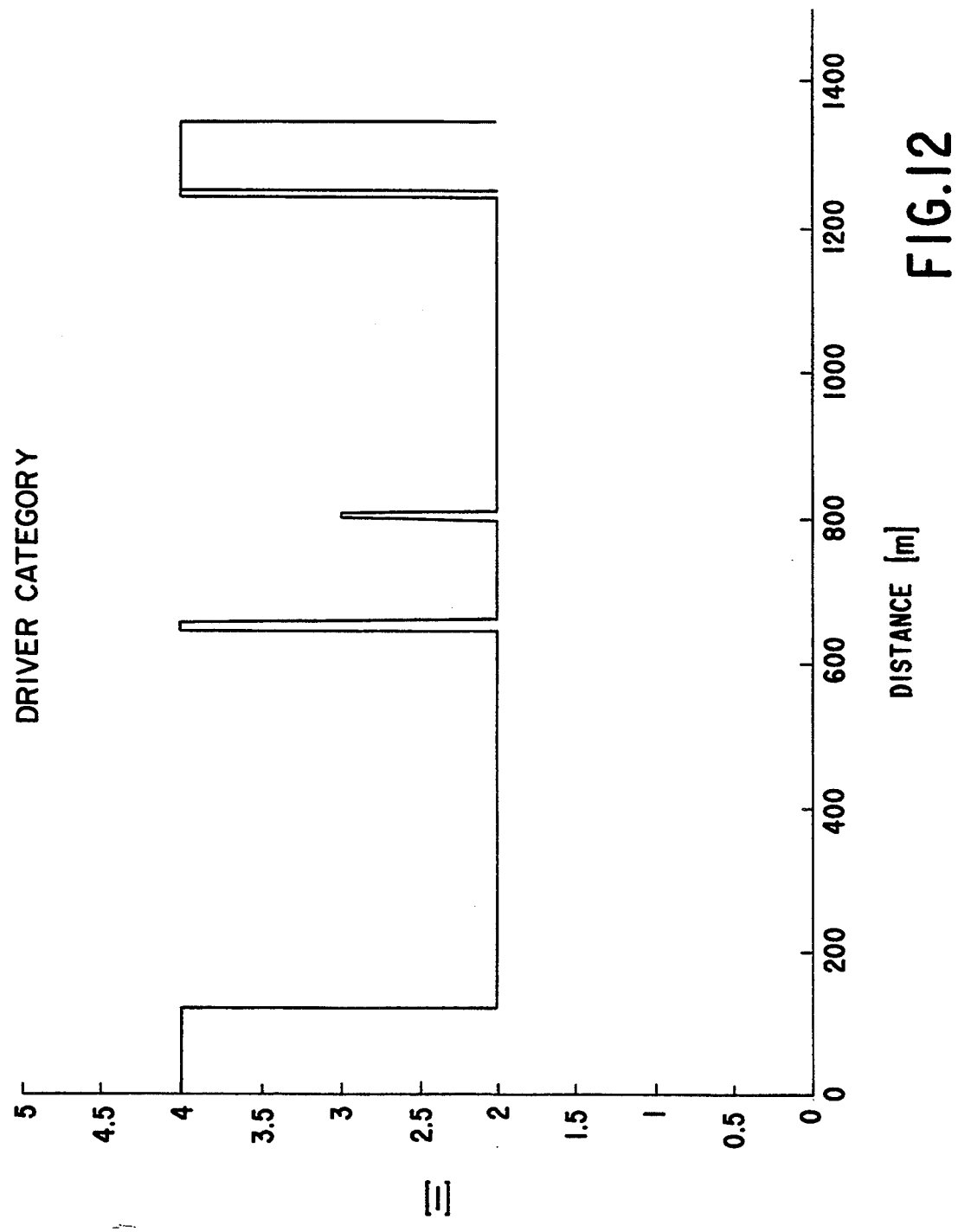
FIG. 12 is a graph showing a driver category signal of the transmission control of FIG. 2, plotted over the distance.

The driver category represents a classification of the driver. An average driver is assigned a driver category of 2, and a sporty driver is assigned a driver category of 4, as is seen in FIG. 12.

Figure 13:
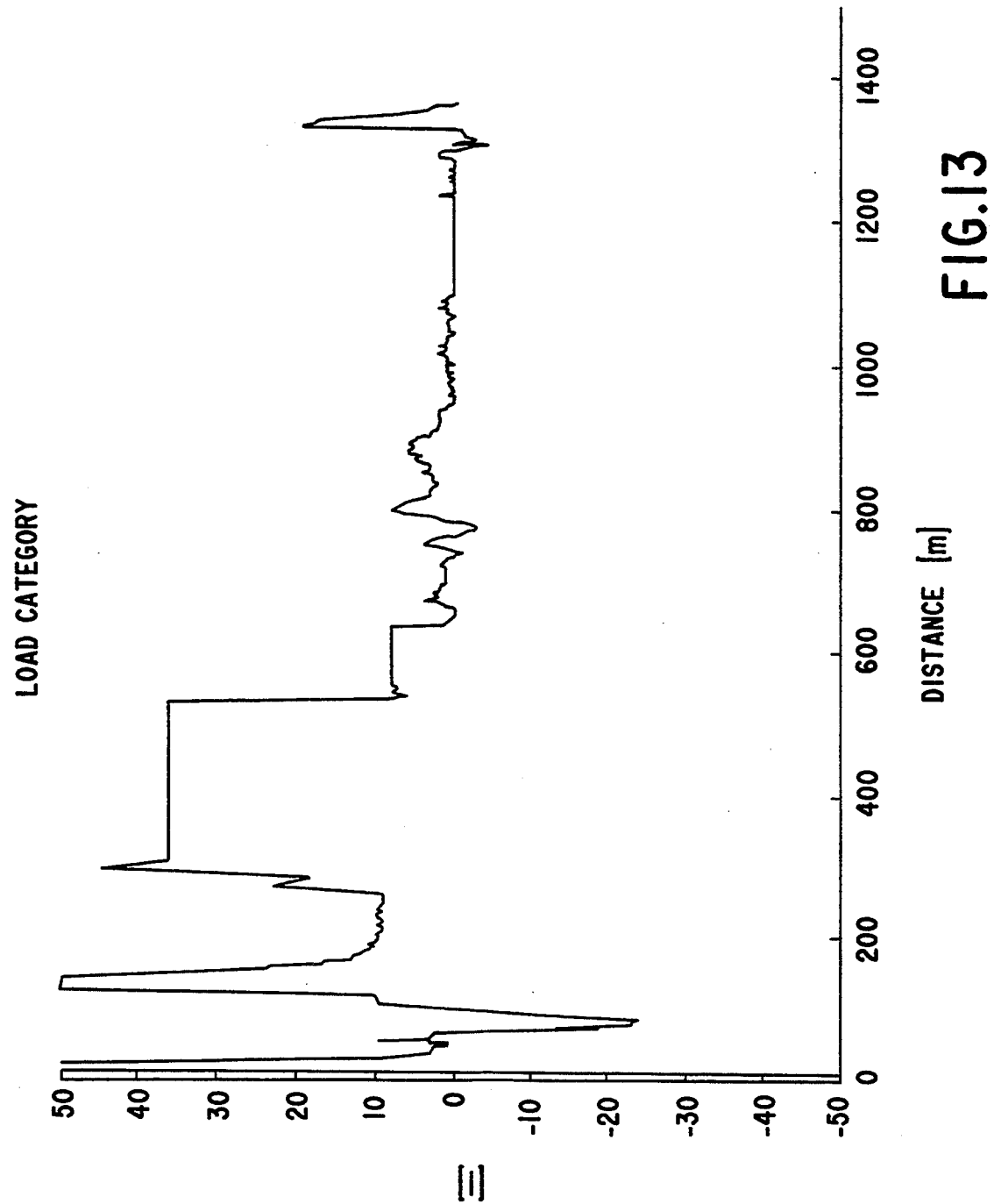
FIG. 13 is a graph showing a load category signal of the transmission control of FIG. 2, plotted over the distance.

The load category correlates with the torque balance at the transmission output. If the load category exceeds an upper load limit, then a switchover is made to the driving performance-oriented shifting performance graph, while if it drops below a lower level, a shift is made to the consumption-oriented shifting performance graph in FIG. 13.

Figure 14:
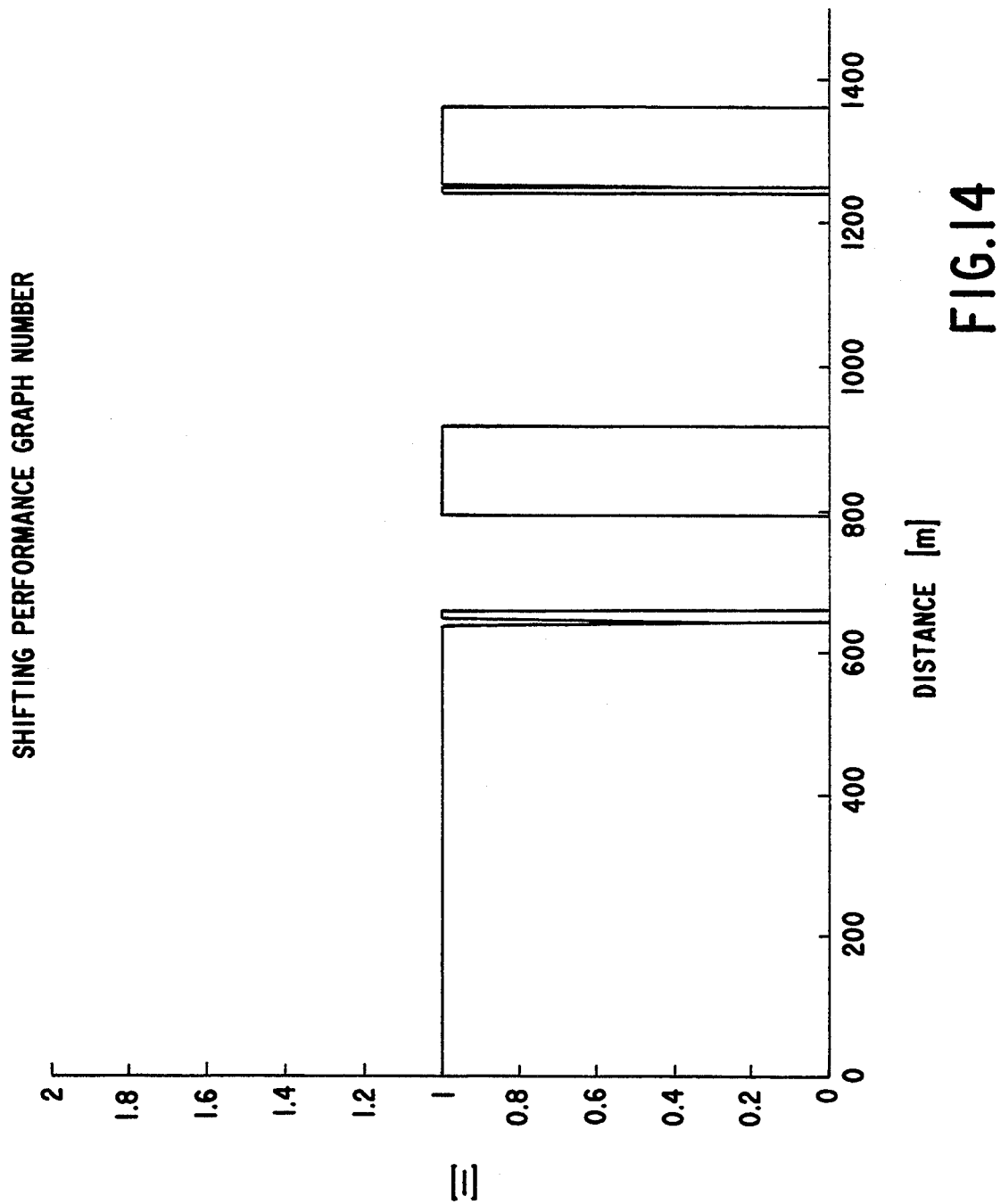
FIG. 14 is a graph showing shifting performance graph numbers of the transmission control of FIG. 2, plotted over the distance.

A shifting performance graph number in FIG. 14 indicates the shifting performance graph (0=consumption-oriented, 1=driving performance-oriented). It is also possible to switch among a plurality of shifting performance graphs. The shifting performance graph number results from linking together the driver category and the load category.

Figure 15:
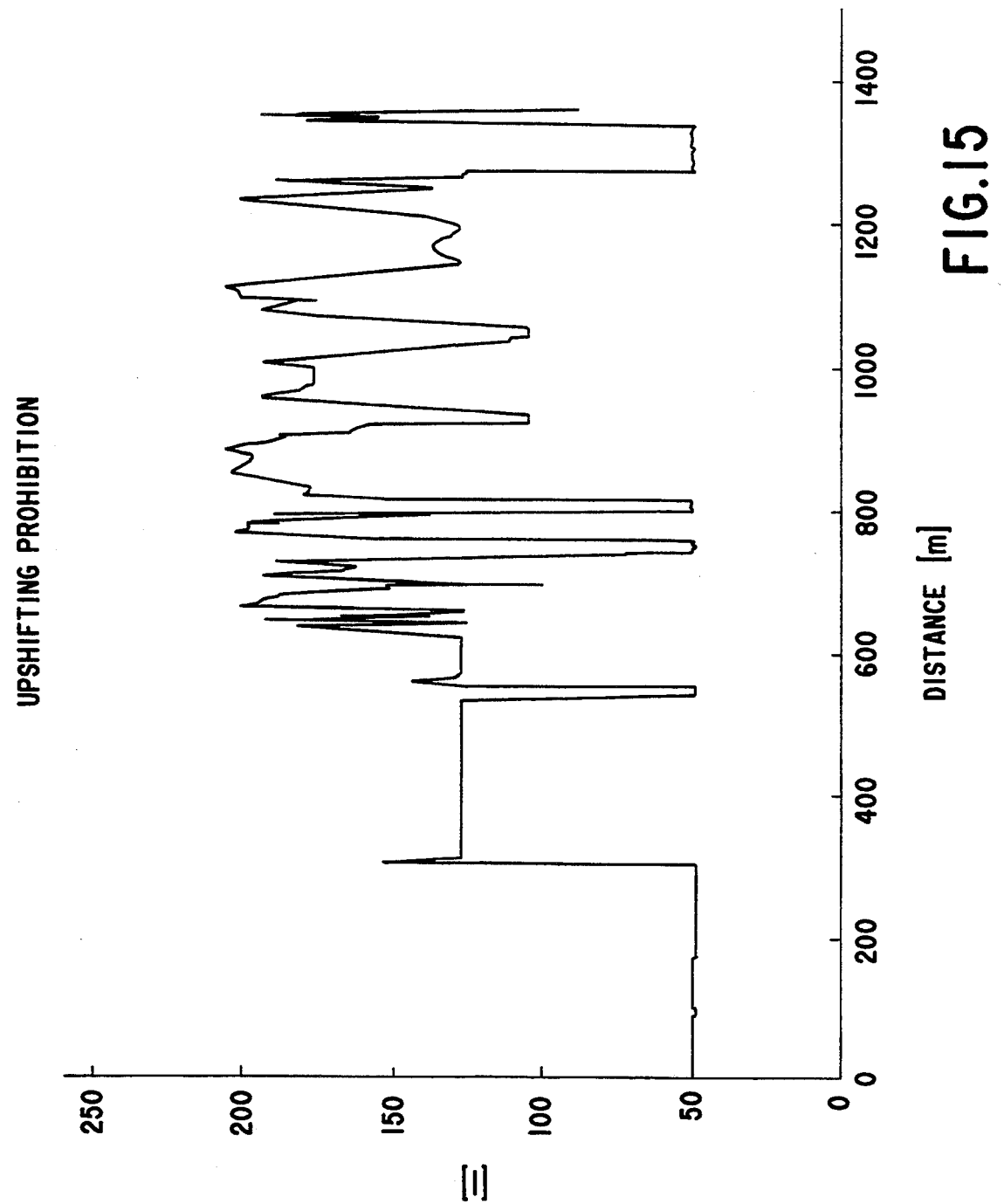
FIG. 15 is a graph showing an upshifting prohibition signal of the transmission control of FIG. 2, plotted over the distance.

Taking vehicle dynamics into particular account, upshifting or downshifting to the next driving speed is prevented by the upshifting or downshifting prohibition. If the value of the upshifting prohibition exceeds a fixed limit, then upshifting to the higher gear is prevented, according to FIG. 15.

Figure 7:
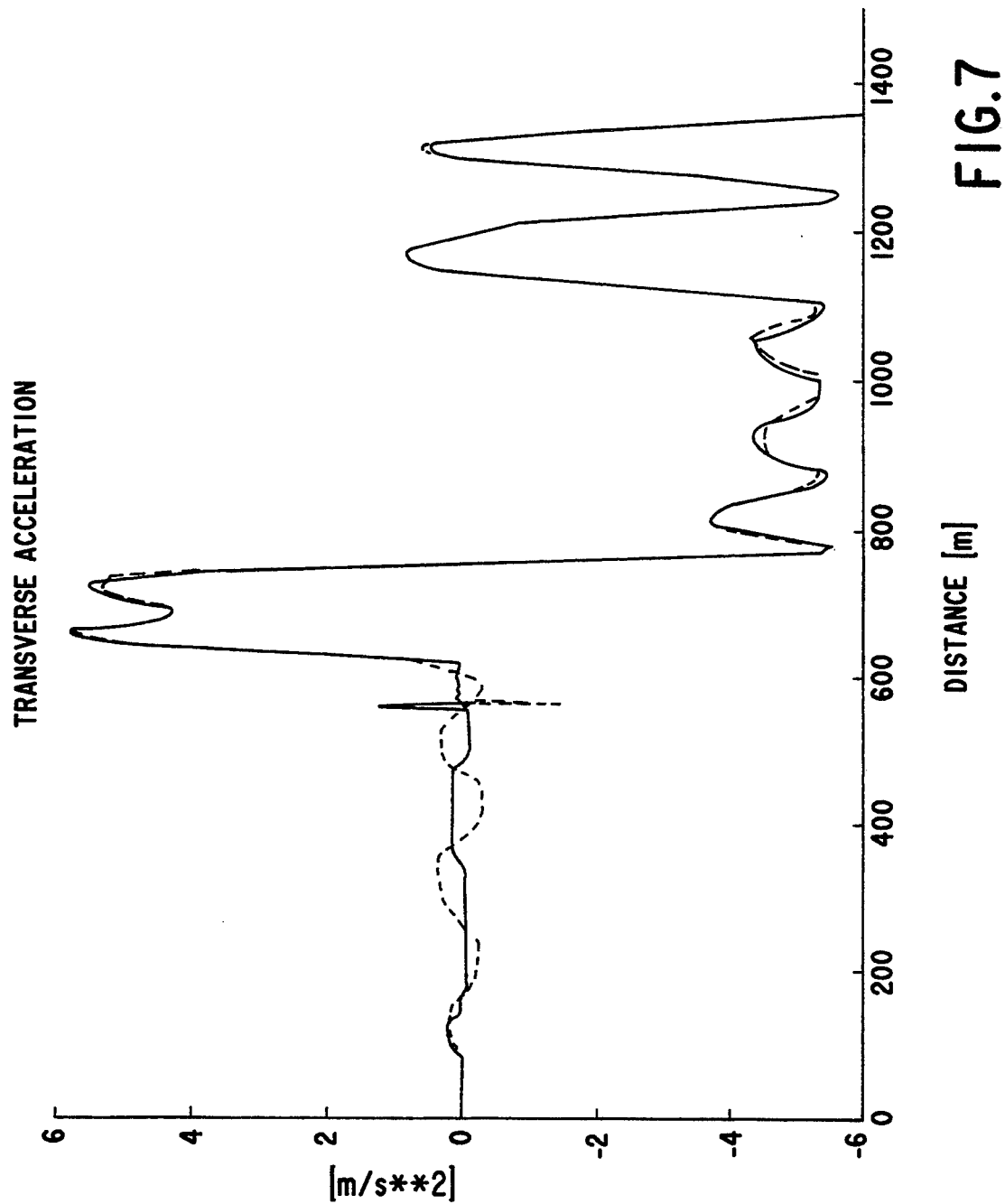
FIG. 7 is a graph showing a transverse acceleration of the motor vehicle plotted over the distance.
Figure 16:
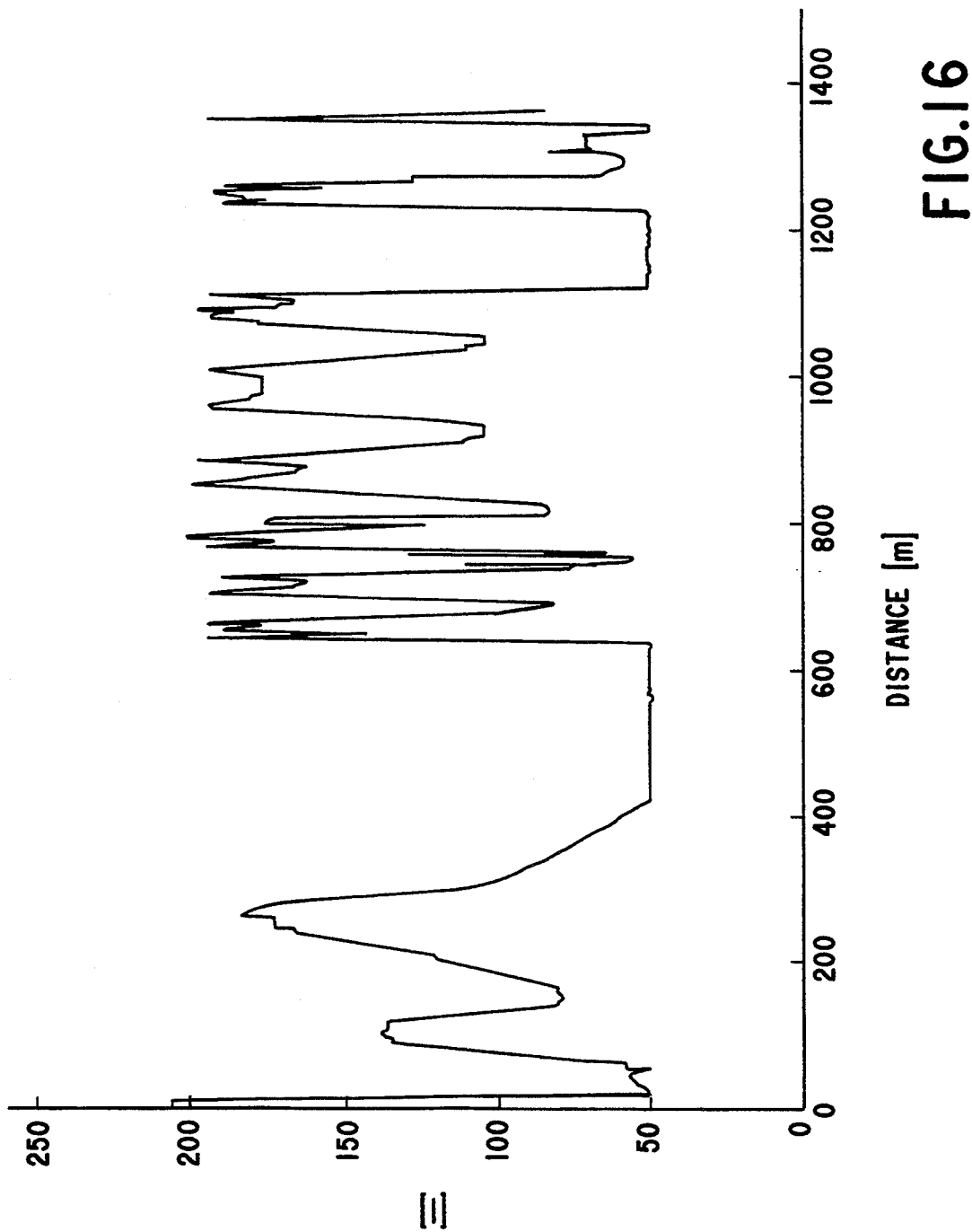
FIG. 16 is a graph showing a downshifting prohibition signal of the transmission control of FIG. 2, plotted over the distance.

The situation is similar for the downshifting prohibition of FIG. 16. In critical driving situations, the downshifting prohibition stabilizes the vehicle. For instance, in a curve with a major change in throttle valve angle and at high transverse acceleration (see also FIG. 7), shifting back to the lower gear is prevented so that the vehicle will not start to spin out because of overly high tire slip.

Figure 9:
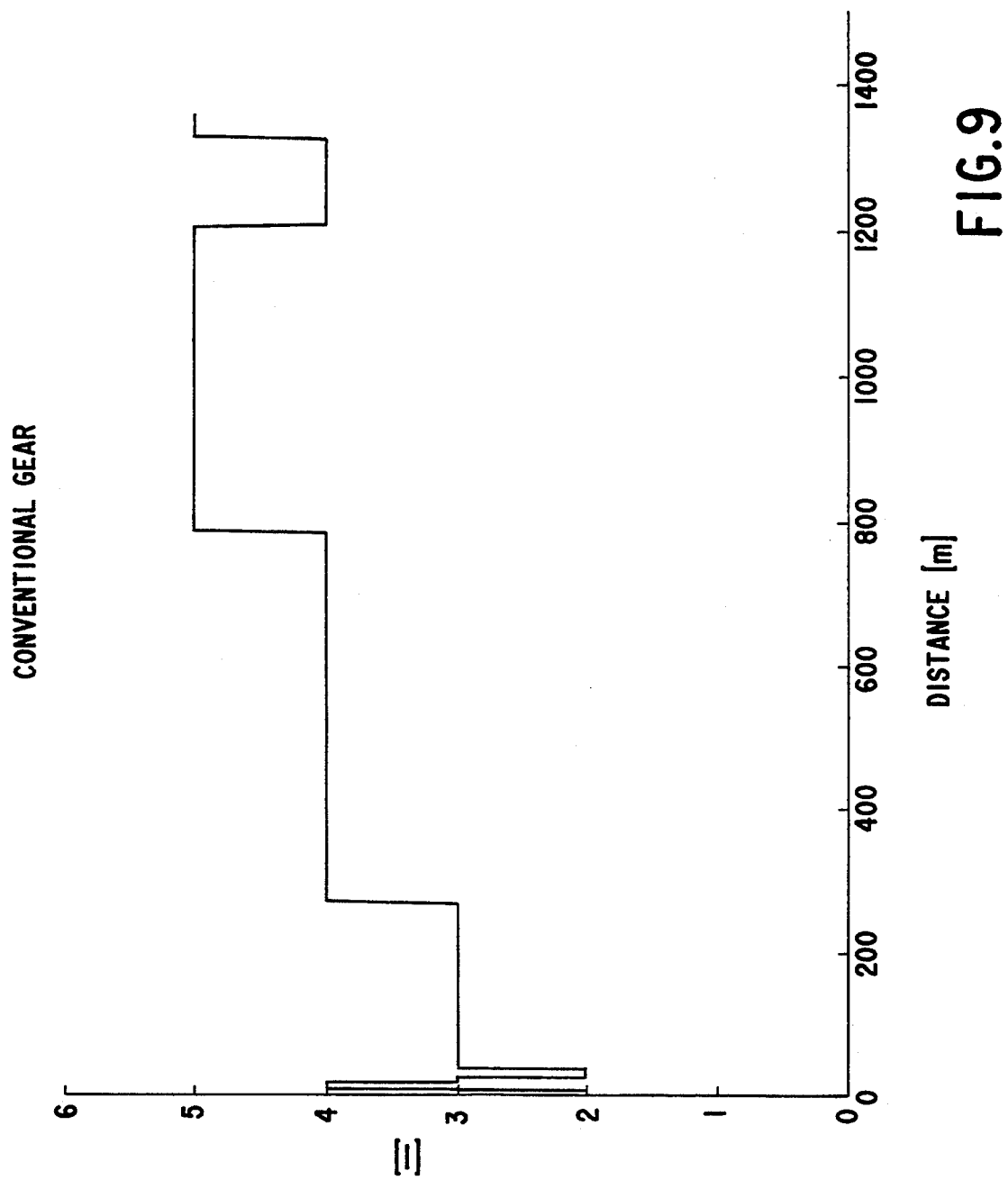
FIG. 9 is a graph showing the gears shifted by a transmission control without a fuzzy controller, plotted over the distance.

The load and driver category output signals of the fuzzy logic controller 23 trigger only one of two shifting performance graphs in this case. During uphill travel (the distance between the 50 m and 550 m markers), the fuzzy transmission control recognizes a load that deviates from the constructive layout of the motor vehicle and recognizes a sportscar-oriented driver. The fuzzy transmission control switches over to the performance-oriented shifting performance graph. The result is that the engine is speeded up somewhat more, and the shift from second to third gear and third to second gear (in FIGS. 8 and 10) takes place somewhat later in comparison with the change of gears in the convention transmission control (FIGS. 9 an 11). In the long curve (the distance between the 550 m and 1000 m markers), the fuzzy transmission control recognizes high tire slip and high transverse acceleration. In the case of certain segments of the distance, it calculates an upshifting prohibition, which leads to stabilization with the vehicle transmission being used. The fuzzy transmission control retards the change from fourth to fifth gears, as compared with the conventional transmission control.

We claim:

1. In a control for a motor vehicle transmission, through which transmission gears are automatically shifted as a function of at least a driving pedal position and vehicle speed on the basis of shifting performance graphs stored in a memory, and in dependence on a load state of the motor vehicle and the driving style of the driver, the improvement comprising:

a fuzzy logic controller with a rule base, for evaluating various signals representing driving states of the motor vehicle, and thereupon generating the following control signals:

a first correcting signal representing the load state of the motor vehicle, and a second correcting signal representing the driving style, bringing about a switchover to corresponding shifting performance graphs, and an inhibit signal preventing shifting events that would produce a dynamically unfavorable driving state.

2. The control according to claim 1, including a selection circuit connected to said fuzzy logic controller for receiving the first and second correcting signals, through which the switchover to a corresponding shifting performance graph is carried out.

3. The control according to claim 1, including a shifting process control connected to said fuzzy logic controller for receiving the inhibit signal, through which shifting is prevented.

4. The control according to claim 1, including wheel rpm sensors furnishing signals, and a signal preparation circuit connected to said wheel rpm sensors for receiving the signals from said wheel rpm sensors to ascertain a transverse acceleration of the motor vehicle and preventing shifting by said fuzzy logic controller if a predetermined value for the transverse acceleration is exceeded.

5. The control according to claim 1, including a signal preparation circuit and a plurality of sensors connected to said signal preparation circuit, said sensors providing signals representing drive force, air resistance, rolling resistance, acceleration resistance and brake force of the motor vehicle, said signal preparation circuit including means in which a differential force representing the load state of the motor vehicle is ascertained from drive force, air resistance, rolling resistance, acceleration resistance and brake force, and is evaluated in said fuzzy logic controller.

6. The control according to claim 5, including an ABS control unit transmitting the value of the brake force to said signal preparation circuit.

7. The control according to claim 5, including an ABS sensor transmitting the value of the brake force to said signal preparation circuit.

* * * * *